(12) United States Patent
Rolle

(10) Patent No.: US 11,494,546 B2
(45) Date of Patent: Nov. 8, 2022

(54) SYSTEM TO FACILITATE FORMATTING OF ACQUIRED DATA

(71) Applicant: SAP SE, Walldorf (DE)

(72) Inventor: Benny Rolle, Karlsruhe (DE)

(73) Assignee: SAP SE, Walldorf (DE)

( * ) Notice: Subject to any disclaimer, the term of this patent is extended or adjusted under 35 U.S.C. 154(b) by 220 days.

(21) Appl. No.: 16/995,994

(22) Filed: Aug. 18, 2020

(65) Prior Publication Data

US 2022/0058333 A1 Feb. 24, 2022

(51) Int. Cl.
*G06F 40/103* (2020.01)
*G06F 40/197* (2020.01)
*G06Q 10/10* (2012.01)
*G06F 16/25* (2019.01)

(52) U.S. Cl.
CPC .......... *G06F 40/103* (2020.01); *G06F 16/258* (2019.01); *G06F 40/197* (2020.01); *G06Q 10/10* (2013.01)

(58) Field of Classification Search
CPC .... G06F 40/103; G06F 16/258; G06F 40/197; G06Q 10/10
See application file for complete search history.

(56) References Cited

U.S. PATENT DOCUMENTS

| | | | |
|---|---|---|---|
| 2007/0136237 A1* | 6/2007 | Barker | G06F 21/6227 |
| 2009/0198670 A1* | 8/2009 | Shiffer | G06F 16/334 |
| | | | 707/999.005 |
| 2009/0198892 A1* | 8/2009 | Alvarez | G06F 12/0875 |
| | | | 711/E12.001 |
| 2009/0271372 A1* | 10/2009 | Fife | G06F 16/2452 |
| 2011/0019917 A1* | 1/2011 | Cantral | G06V 10/22 |
| | | | 382/190 |
| 2012/0096525 A1* | 4/2012 | Bolgert | G06F 11/3006 |
| | | | 726/6 |
| 2012/0136840 A1* | 5/2012 | Oaten | G06N 5/02 |
| | | | 707/690 |
| 2015/0052162 A1* | 2/2015 | Arnold | G06F 16/2365 |
| | | | 707/756 |
| 2016/0063056 A1* | 3/2016 | Schmidt | G06F 21/6218 |
| | | | 707/603 |
| 2016/0203817 A1* | 7/2016 | Formhals | H04M 3/5116 |
| | | | 379/45 |
| 2017/0212731 A1* | 7/2017 | Beck | G06F 9/44536 |
| 2019/0042554 A1* | 2/2019 | Aylett | G06F 40/186 |
| 2019/0050597 A1* | 2/2019 | Barday | G06F 16/951 |
| 2019/0156058 A1* | 5/2019 | Van Dyne | G06F 16/2457 |
| 2020/0117824 A1* | 4/2020 | Upadhyay | G06F 21/6227 |
| 2022/0035823 A1* | 2/2022 | Morton | G06F 16/24575 |
| 2022/0035830 A1* | 2/2022 | Kim | G06F 16/26 |

* cited by examiner

*Primary Examiner* — Nathan Hillery
(74) *Attorney, Agent, or Firm* — Buckley, Maschoff & Talwalkar LLC

(57) ABSTRACT

Systems and methods include requesting, from a first application system, of data associated with a data subject, reception, from the first application system and in response to the request, of the data associated with the data subject and data contexts respectively associated with the data, presentation of the data and the data contexts to a user, reception of instructions from the user to generate a first configuration including at least one mapping of a data context to a descriptive field value, generation of a first report based on the data, the data contexts and the first configuration, presentation of the first report to the user, and storage of the first configuration in association with the first application system.

15 Claims, 6 Drawing Sheets

SYSTEM TO FACILITATE FORMATTING OF ACQUIRED DATA

BACKGROUND

Conventional software applications store data for use during operation thereof. The data often includes details associated with natural persons, including but not limited to names, addresses, telephone numbers and other potentially-identifying data. Such data is increasingly subjected to various data privacy regimes. Entities providing the software applications must therefore ensure that their software applications and the storage of any data thereby are compliant with applicable laws. For example, certain laws require on-demand production of "personal" data based on a request received from any given data subject. Moreover, the data must be presented to the data subject in an understandable format.

A software application typically represents and manages stored data using a dedicated data schema. Modern distributed computing environments typically consist of several independent or semi-independent application systems, each of which maintains its own unique data schema. The disparate data schemas may represent unique data subjects in different ways. Accordingly, it is technically challenging to provide a generic system for acquiring data from one or more application systems and presenting the data along with understandable annotations.

Some conventional systems attempt to address the foregoing by providing participating application systems with a common list of data contexts. Each participating application is responsible for mapping its data schema to appropriate data contexts of the list. Upon receiving a request for data concerning a particular data subject, an application system retrieves the corresponding data, maps the data to corresponding data contexts of the list, and provides the mapped data to the requestor. The foregoing approach requires significant design-time effort in creation of the pre-defined list and is inflexible, inefficient, and perhaps even unusable in the case of certain application system data schemas.

Improved systems for formatting data associated with a data subject and acquired from one or more disparate application systems are desired.

DETAILED DESCRIPTION

Figure 1A:
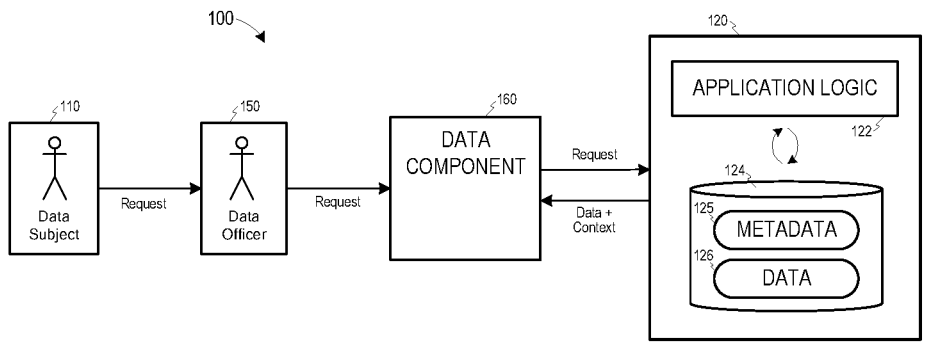
FIGS. 1A through 1D are block diagrams illustrating operation of a system architecture to provide formatted data according to some embodiments.

The following description is provided to enable any person in the art to make and use the described embodiments. Various modifications, however, will remain readily-apparent to those in the art.

Some embodiments facilitate efficient formatting of context-enhanced data received from one or more heterogenous application systems into suitable reports. An application system as described herein comprises a computing environment configured to provide functionality to a user. Examples of application systems include a Web store, a Short Message Service system, a Customer Relationship Management system, and a banking system. One or more application systems in the following examples may be a distributed cloud application.

Embodiments may provide an integrated approach for customizable and reusable formatting of context-enhanced data received from multiple application systems. For example, an application system may be queried for data related to a data subject and, in response, may return the data along with context information (i.e., metadata) describing the data. A user may generate a configuration which can be applied to the context-enhanced data to generate a suitable report. The configuration can be re-used and/or edited as needed in order to generate reports from other context-enhanced data subsequently received from the application system. Different configurations may be applied to data received from different application systems. A same configuration may be applied to data received from different application systems, particularly if the different application systems share similar contexts/data schemas.

Although embodiments are described below with respect to personal data, any other data associated with a particular data subject may be acquired using some embodiments. In this regard, embodiments may operate to retrieve and format data associated with a same data subject from within the data of disparate application systems.

FIGS. 1A through 1D illustrate operation of system 100 according to some embodiments. System 100 operates to retrieve and format personal data of data subject 110. Data subject 110 will be described herein as a natural person but embodiments are not limited thereto. Data subject 110 may comprise a company, a department, an authority or any other entity which may be represented within application system 120. The entity may be represented by a unique identifier (e.g., customer number, etc.), but embodiments are not limited thereto. Data officer 150 may comprise one or more individuals designated to receive requests for personal data from data subjects and to fulfill those requests.

Application system 120 executes application logic 122 to provide functionality to users. The functionality of application logic 122 is provided based on data 126 stored in data store 124. Metadata 125 is also stored in data store 124 and provides information regarding the structure and semantics of data 126 as is known in the art. Metadata 125 and data 126 may include any data which is used and/or generated during operation of application system 120. It should be noted that a single computing system may operate multiple different applications (i.e., multiple instances of different application logic), with each application managing corresponding metadata and data stored in data store 124. The metadata and data corresponding to an application operating in such a computing system may be dedicated to that application or shared, in whole or in part, by two or more applications.

Data 126 may include, among other data, personal data relating to various respective data subjects. Non-exhaustive examples of personal data include name, date of birth, government-issued identification number, passport number, street address, telephone number, income, transactional data (e.g., sales orders), etc. Generally, any data that can be associated with a data subject can be considered personal data. Once the identity of a data subject (e.g., a customer ID) as represented within application system 120 is known, application system 120 may execute a simple query to acquire and return the personal data associated therewith. The particular personal data used by application logic 122 depends upon the functionality provided by application logic 122. Embodiments are not limited to personal data, and may be used in conjunction with any type of data.

Application system 120 may comprise any combination of computing hardware and software for providing application functionality to users. Any components of application system 120 may be distributed and-or cloud based. Embodiments are not limited to any particular implementation, except as provided herein, of application system 120.

Data store 124 may support one or more of conventional tabular data, row-based data, column-based data, and object-based data. Data store 124 may comprise an in-memory or disk-based database, and/or a cloud-based database system remote from associated application logic.

FIG. 1A depicts reception by data officer 150 of a request for personal data from data subject 110. The request may include identifying information of data subject 110. The request may be submitted according to protocols prescribed by an organization employing data officer 150 in order to satisfy applicable data handling laws and regulations.

Data officer 150 may initiate fulfillment of the request by first verifying the identifying information provided by data subject 110 and then sending a request for associated data to data component 160. In response, data component 160 queries application system 120 for the data using any mechanism that is or becomes known. For example, data component 160 may call a dedicated interface implemented by application system 120 to facilitate the acquisition of personal data, but embodiments are not limited thereto.

Application system 120 acquires requested data from data 126 and augments (i.e., annotates) the acquired data with corresponding context information (i.e., data contexts) based on metadata 125. The annotated data (i.e., data and data contexts) is provided to data component 160. Examples of annotated data are provided below. The particular data contexts and the annotation format may both be determined by application logic 122, thereby providing increased flexibility thereto in comparison to conventional systems.

Figure 1B:
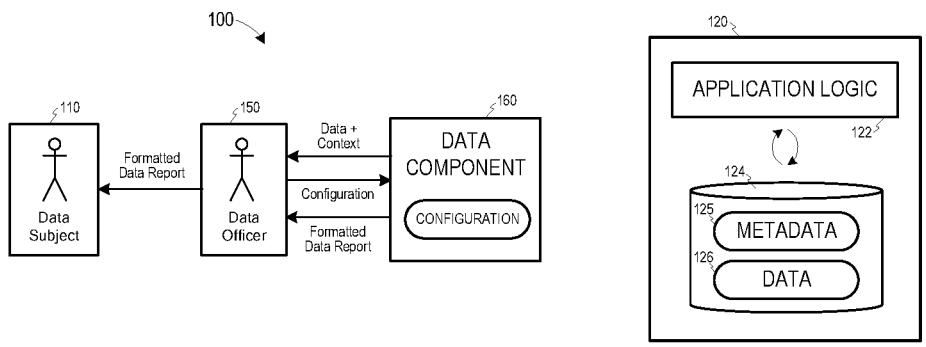

Turning to FIG. 1B, data component 160 presents the received data and data contexts to data officer 150. Based on the received data, data officer 150 may generate a configuration consisting of a set of rules, templates, mappings, etc. for converting the received data and associated data contexts to, for example, a data report. The configuration may include mappings for converting certain data to other values and/or data contexts to descriptive fields and may be returned to data component 160 for storage thereby.

For example, if the data includes dates in Buddhist Era format, the configuration may specify conversion of those dates to Christian/Common Era dates. In another example, a data context may flag a user as an undesirable customer. The configuration may specify omission of this data context from the report or conversion of this data context to the message "Business relationship ended". The configuration may also convert Boolean values to their logical meanings (e.g., "1"=Male) or provide an additional explanation of any received data and associated context. A configuration may reformat data to hide technical details and/or may enhance the data. In the latter example, the configuration may enhance any currency value in the data with the currency symbol of the country in which the data subject is located (which is determined from the returned data). Embodiments are not limited to the examples above.

Data component 160 formats the data and associated data contexts into a data report based on the configuration and returns the data report to data officer 150. Data officer 150 may edit the configuration based on the report, and then transmit the edited configuration to data component 160 to generate another data report. Once the data report is satisfactory, data officer 150 provides the data report to data subject 110.

Figure 1C:
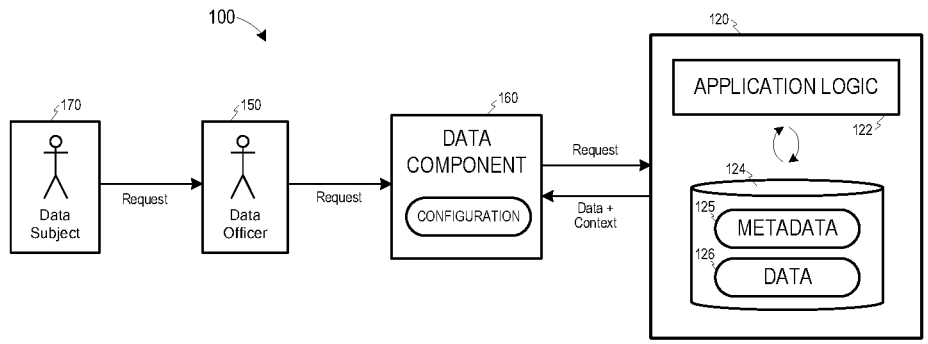

FIG. 1C illustrates reception by data officer 150 of a second request from second data subject 170. Operation proceeds in response to the received request as described with respect to FIG. 1A. Data officer 150 forwards the request to data component 160, which queries application system 120 for data associated with second data subject 170 and receives data and associated data contexts in return.

Figure 1D:
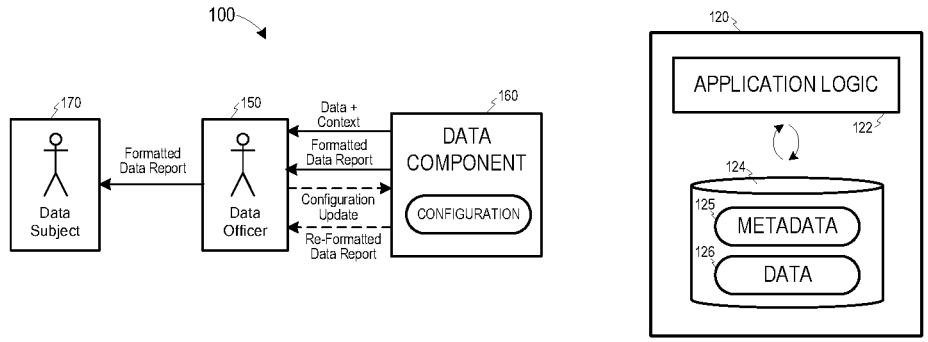

Next, as shown in FIG. 1D, data component 160 applies the previously-generated and stored configuration to the received data and data contexts in order to generate a data report. The particular stored configuration may be applied because the data and data contexts were received from the same application system (i.e., application system 120) as the data and data contexts based on which the configuration was created. Data component 160 provides the data and data contexts, as well as the data report, to data officer 150.

As described above, and represented by dashed arrows in FIG. 1D, data officer 150 may edit the configuration based on the report, and then transmit the edited configuration back to data component 160 to generate another data report. Once the data report is satisfactory, data officer 150 provides the data report to data subject 110.

Figure 2:
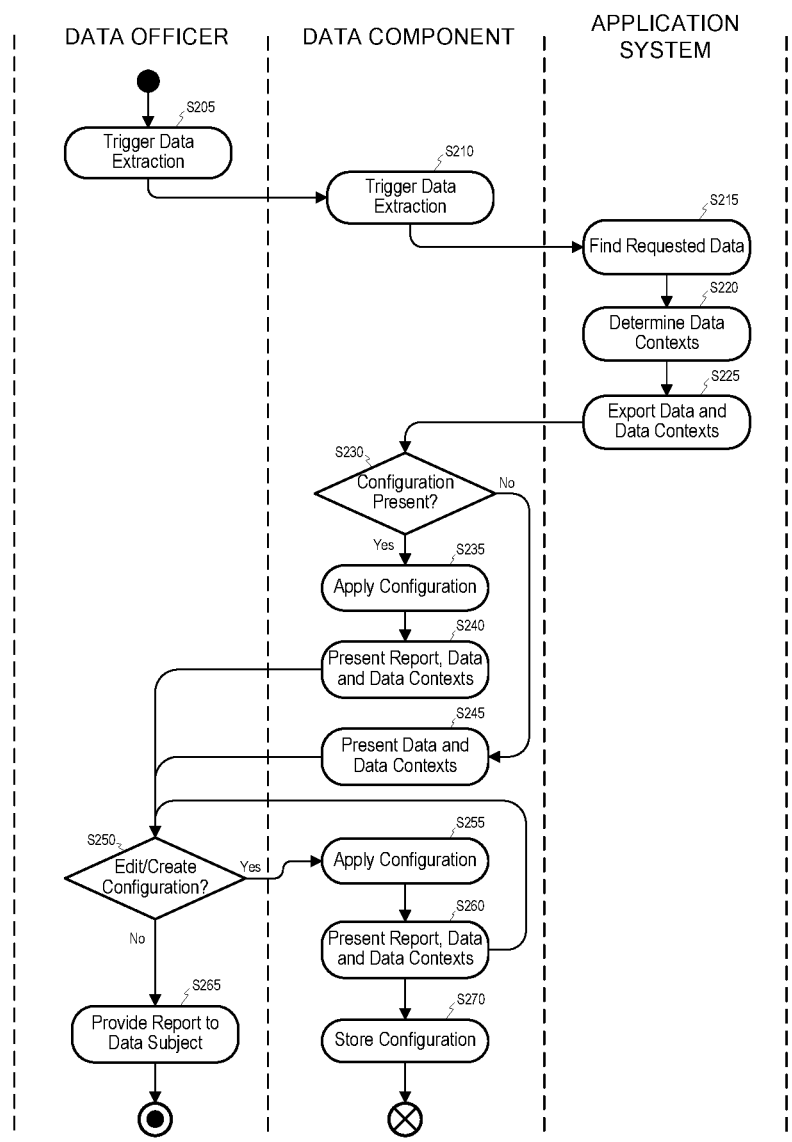
FIG. 2 is a diagram of a process to extract and format data received from an application system according to some embodiments.

FIG. 2 is a diagram illustrating steps performed by various components according to some embodiments. All processes described herein may be performed using any suitable combination of hardware and software. Software program code embodying these processes may be stored by any non-transitory tangible medium, including but not limited to fixed disks, volatile or non-volatile random access memory, DVDs, and Flash drives, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Prior to S205, a data officer receives a request for data concerning a data subject. The data officer may be responsible for handling such requests with respect to each of a plurality of application systems. A single company may operate each of the plurality of application systems and the company may dictate the form of submitted requests and the manner of submission. The form and manner may be developed so as to comply with applicable data privacy laws and regulations. The data officer may verify identifying information submitted along with the request to ensure the requestor is authorized to receive the requested data (e.g., is in fact the data subject for whom personal data is being requested). Confirmation of the identity may comprise any electronic authorization method, including but not limited to username/password and multi-factor authentication, or transmitting a copy of a passport.

Figure 3:
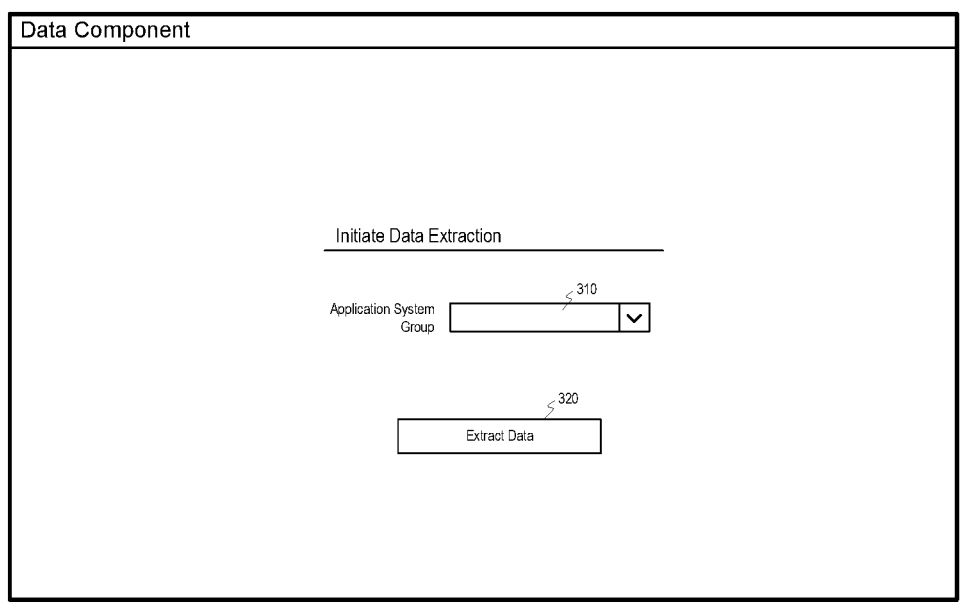
FIG. 3 is a view of a user interface to initiate a search for data associated with a data subject according to some embodiments.

The data officer communicates with a data component at S205 to trigger extraction of the requested data. FIG. 3 illustrates user interface 300 of a data component service according to some embodiments. User interface 300 may be provided by the data component and accessed via a Web browser executing on a computing system operated by the data officer.

User interface 300 includes drop-down menu 310 to allow selection of one of several groups of one or more application systems to which the data component has access. For example, depending on the relationship between the data subject and the data-storing entity, only a certain subset of application systems operated by the entity might be suitable for querying for data associated with the data subject. Once a group of application systems is specified in drop-down menu 310, the data officer may select control 320 to instruct the data component to extract the data from each of the application systems of the selected group.

Accordingly, the data component triggers data extraction at S210. Triggering data extraction at S210 may comprise transmitting a query for the data to an application system using any mechanism that is or becomes known. The application system finds the requested data at S215 and determines corresponding data contexts at S220.

As described above, the data contexts may comprise metadata describing the structure and/or semantic meaning of the data (e.g., DATE_OF_BIRTH_OF_CUSTOMER, DATE_OF_SHIPMENT_TO_CUSTOMER, NAME_OF_SUPPLIER_CONTACT_PERSON). The particular data contexts and the annotation format may both be determined by the application system in a manner best suited to the application system. In some embodiments two or more application systems may determine data contexts at S220 based on a common list of data contexts as described above.

An application system may determine that multiple values of a same database column are associated with different contexts. An application system may determine a context for a value of a field in a database record based on a value of another field in the same record and/or on values of another database record. For example, a STORED_ON field might indicate when a record was created. If a value of the record changes, a new record might be inserted having the STORED_ON field set to the current date. The application may determine, based on the values of the STORED_ON field of the two records, that the context of the address value of the new record is LATEST_RESIDENTIAL_ADDRESS and the context of the address value of the older record is HISTORIC_RESIDENTIAL_ADDRESS.

In the case of a key-value store, the value does not indicate the context since the domain of the value column is generic. S220 may therefore include determination of the actual context based on other considerations, including but not limited to references to the key.

The application system exports the data and data contexts to the data component at S225. An example format and content of the exported payload is below:

```
{
"DataSubject"="128973",
"Application"="CustomerManagement",
    [
    {"entry"="name",
        "value"="Max Mueller",
        "context"="NAME_OF_CUSTOMER"},
    {"entry"="pr_name",
        "value"="MuellerM",
        "context"="NAME_OF_CUSTOMER_HOW_PRINTED"},
```

-continued

```
    {"entry"="unwanted_customer",
        "value"="X",
        "context"="NO_BUSINESS_IN_FUTURE_INDICATOR"},
    {"entry"="add",
        "value"="123Street Berlin",
        "context"="CURRENT_ADDRESS_OF_CUSTOMER"},
    {"entry"="add",
        "value"="456Street Munich",
        "context"="HISTORIC_ADDRESS_OF_CUSTOMER"},
    ]
}
```

The sequence diagram of FIG. 2 illustrates operation of a single application system for clarity, but it should be understood that the data component may trigger data extraction from each of two or more application systems of a group, and S215, S220 and S225 may be performed contemporaneously by each of the two or more application systems. In this regard, uniqueness of the data contexts may be maintained using namespaces such as "context"="CustomerManagementApplication: CURRENT_ADDRESS_OF_CUSTOMER".

The data component receives the data and data contexts and determines at S230 whether a corresponding configuration is available. The configuration is used to create user-friendly outputs for the data subject. Generally, the configuration is used to avoid providing raw data to a data subject without proper formatting, filtering, etc. For example, personal data should be filtered out if it concerns also other data subjects in addition to the current data subject. Data might require reformatting if the formatting is based on technical details. This formatting and filtering functions do conceptually not belong to the application system domains but rather to the domain of data protection and privacy. Accordingly, these functions are handled within the data component using an appropriate configuration.

The determination at S230 might include searching a data store of the data component for a configuration associated with the application system from which the data and data contexts were received. In this regard, the data component may store one or more configurations respectively associated with one or more application systems. It will be assumed that no configuration has yet been generated for the application system and therefore the determination at S230 is negative and flow proceeds to S245.

The data component presents the data and data contexts to the data officer at S245. The data officer then determines whether to create or edit a corresponding configuration at S250. Since no configuration currently exists in the present example, and rather than return the raw data and data contexts to the data subject, the data officer creates a corresponding configuration at S250. The configuration, as described above, may consist of a set of rules, templates, mappings, etc. for creating a data report based on the received data and associated data contexts. The configuration may also include any text which the data officer determines to include in the data report.

In some jurisdictions, requests for personal data should be fulfilled within 30 days of receipt. Accordingly, a configuration may be created during the normal course of replying to data requests. For example, if certain returned data values require revised context information to be understandable, this revision can be included in a configuration when first encountered in data returned from an application system, and will be available for use in converting data returned from the same application system for subsequent data requests. Some data contexts (e.g., CUSTOMER_NAME) might not require conversion or augmentation.

A configuration may be created using any suitable interface(s) and/or paradigm for mapping data and data contexts to a satisfactory data report. Such mapping may include conversions as described above and any other required logic. In some embodiments, a configuration includes a text document having fields corresponding to data contexts, and application of the configuration includes replacing the fields with data associated with data contexts corresponding to the fields. A configuration may include mappings from data contexts to descriptive field values (e.g., "BP_Name" to "BUSINESS PARTNER"). A configuration may also or alternatively include a spreadsheet having columns corresponding to data contexts, where application of the configuration includes populating the columns with data associated with data contexts corresponding to the columns.

The created configuration is provided to the data component and applied to the data and data contexts at S255 to generate a data report. The report, data and data contexts are then presented to the data officer at S260, who again determines at S250 whether to further edit the configuration. In parallel, the data component stores the configuration at S270.

Figure 4:
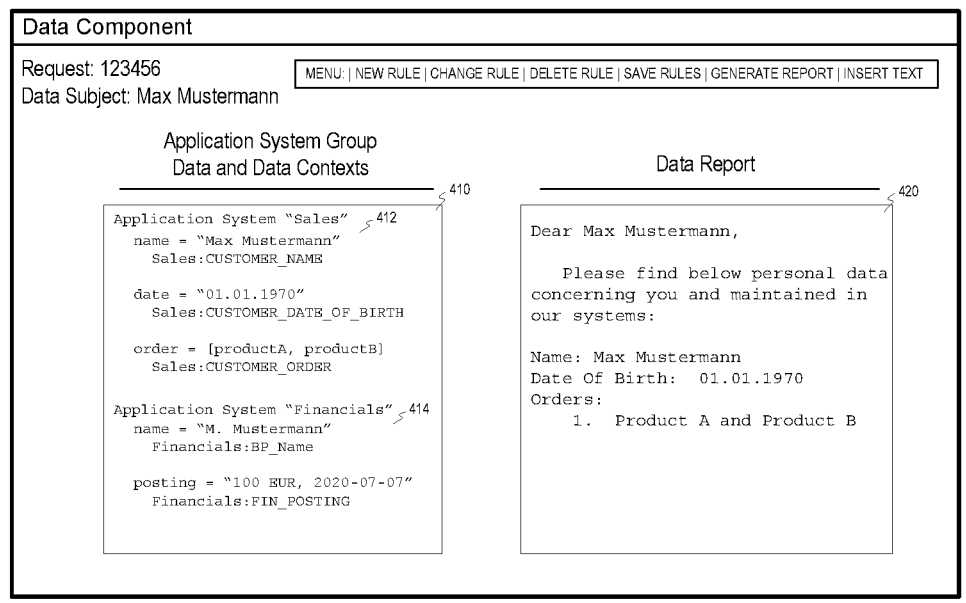
FIG. 4 is a view of a user interface presenting acquired data and data contexts, and a corresponding data report generated based on a configuration according to some embodiments.

FIG. 4 illustrates user interface 400 provided by the data component and used by the data officer at S250 according to some embodiments. As shown, user interface 400 presents data and data contexts 410 received from two application systems (i.e., Sales and Financials) and a data report 420 generated by applying a stored configuration to data and data context 410. The data officer may operate the controls of user interface 400 and other associated user interfaces to edit the configuration (i.e., Rules), and then transmit the edited configuration to the data component to generate another data report based on the edited configuration. Embodiments are not limited to user interface 400.

Once the data officer determines at S250 that the report is satisfactory, the data officer provides the data report to the data subject at S265. As noted above, the stored configuration may be used to generate a data report based on data and data contexts of a next data subject retrieved from the same application system(s), and/or from other application system(s) having a same or similar data schema. In the latter case, the configuration may be edited as described above and stored as a new configuration associated with the other application system(s).

Figure 5:
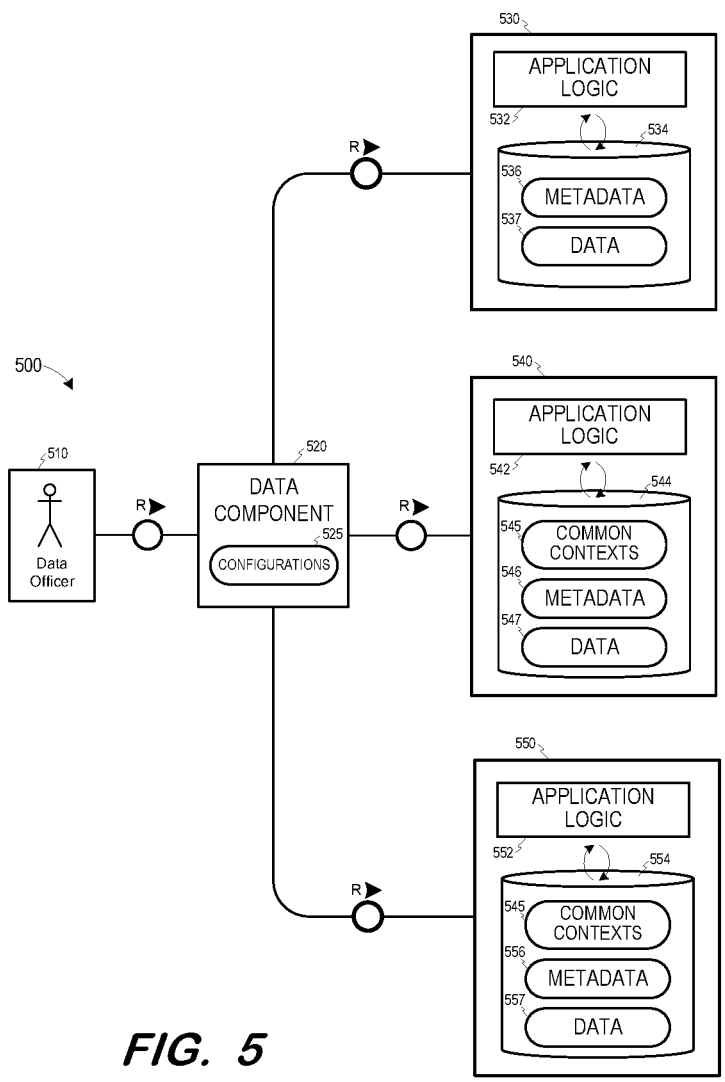
FIG. 5 is a block diagram of a system architecture including a plurality of application systems according to some embodiments.

FIG. 5 is a block diagram of system 500 according to some embodiments. System 500 may comprise an implementation of corresponding elements of system 100 of FIG. 1 and operate as described above, but embodiments are not limited thereto.

Each of application systems 530, 540 and 550 includes respective application logic 532, 542 and 552 which is executable in conjunction with stored application data to provide desired functionality. Application system 530 may operate as described above with respect to application system 120. Application systems 540 and 550 both include common contexts 545, which may comprise a shared list of data contexts used by applications systems 540 and 550 to annotate retrieved data as described herein. Accordingly, configurations 525 stored by data component 520 may include a configuration associated with both of application systems 540 and 550 which is to be applied to data and data contexts received therefrom, and a separate configuration associated with application system 530 which is to be applied to data and data contexts received therefrom. The separate configurations may be applied to produce two separate data reports in response to a request from a given data subject. In some embodiments, a single configuration 525 is generated to be applied to data and data contexts received from any and all of application systems 530, 540 and 550.

Figure 6:
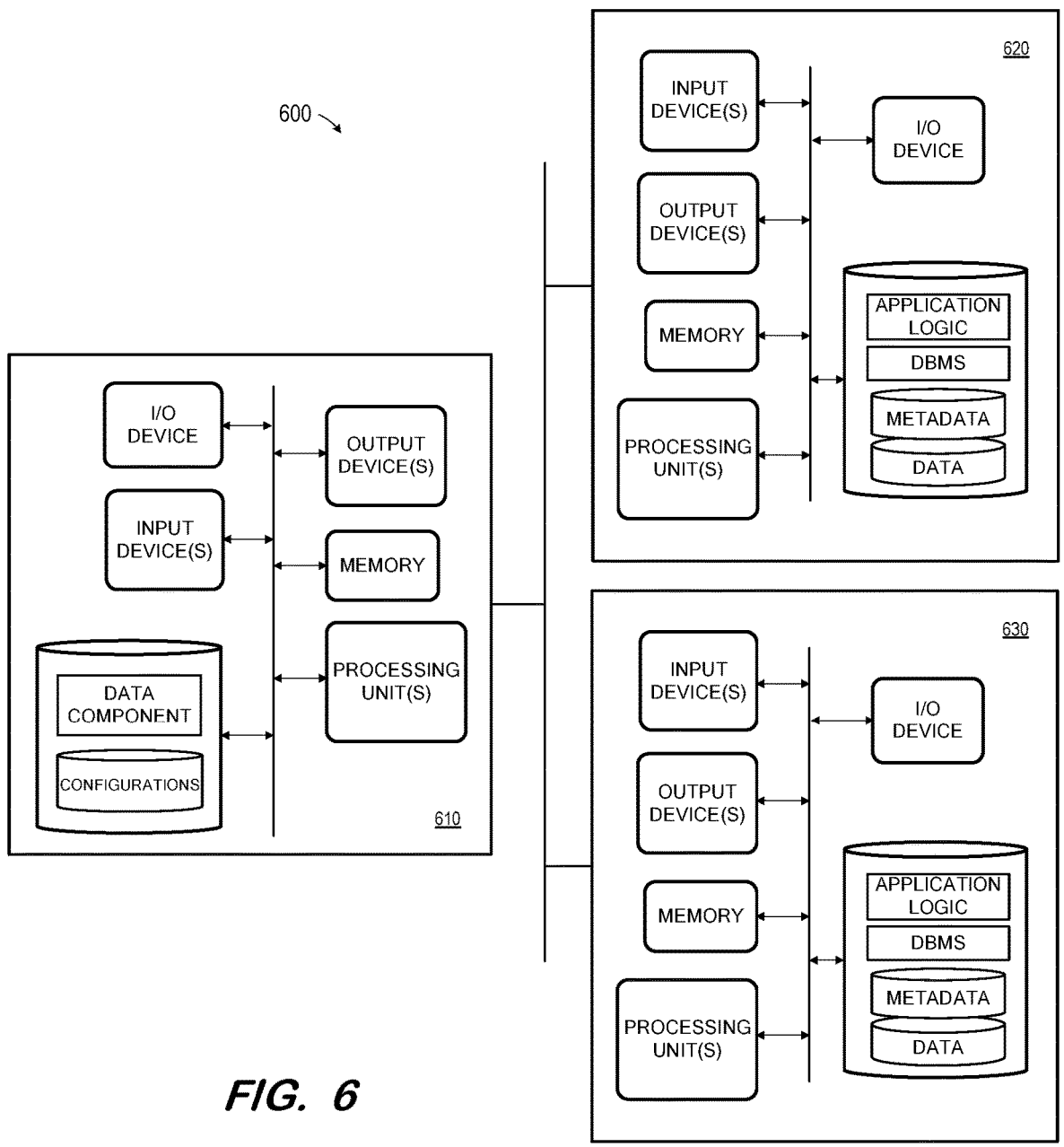
FIG. 6 is a block diagram of computing devices comprising a system architecture according to some embodiments.

FIG. 6 is a block diagram of system 600 according to some embodiments. System 600 includes data component system 610, which may comprise an implementation of data component 160 or data component 520. As described above, data component system 610 may comprise a cloud-based system accessible via a Web browser of a client device operated by a data officer. Data component system 610 may therefore include processor-executable program code of a data component as described above and a Web server. Data component system 610 also stores configurations as described herein.

Each of application systems 620 and 630 may comprise a cloud-based application system implementing any one or more software applications as described herein. Application systems 620 and 630 include processor-executable program code of application logic as described herein, and metadata and data to enable operation in conjunction with data component system 610 as described herein.

Each of systems 610, 620 and 630 may comprise a general-purpose computing apparatus and may execute program code using processing unit(s) to perform any of the functions described herein. Each of systems 610, 620 and 630 may include other unshown elements according to some embodiments.

All data storage mentioned herein may be provided via combinations of magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps;
a processing unit to execute the processor-executable program code to cause the system to:
request, from a first application system, data associated with a data subject;
receive, from the first application system and in response to the request, the data associated with the data subject and data contexts respectively associated with the data;
present the data and the data contexts to a user;
receive instructions from the user to generate a first configuration including at least one mapping of a data context to a descriptive field value;
generate a first report based on the data, the data contexts and the first configuration;
present the first report to the user;
store the first configuration in association with the first application system;
request, from a second application system, second data associated with the data subject;
receive, from the second application system, the second data associated with the data subject and second data contexts respectively associated with the second data;
present the second data and the second data contexts to the user;
receive instructions from the user to generate a second configuration including at least one mapping of a second data context to the descriptive field value;
generate a second report based on the second data, the second data contexts and the second configuration;
present the second report to the user; and
store the second configuration in association with the second application system.

2. A system according to claim 1, wherein the user presents the first report and the second report to the data subject.

3. A system according to claim 1, the processing unit to execute the processor-executable program code to cause the system to:
receive instructions from the user to modify the first configuration to a third configuration;
generate a third report based on the data, the data contexts and the third configuration;
present the third report to the user; and
store the third configuration in association with the first application system.

4. A system according to claim 1, the processing unit to execute the processor-executable process steps to cause the system to:
request, from a third application system, third data associated with the data subject; and
receive, in response to the request from the third application system, the third data associated with the data subject and third data contexts respectively associated with the third data,
wherein the first report is generated based on the data, the data contexts, the third data, the third data contexts and the first configuration, and
wherein the first configuration is stored in association with the first application system and the third application system.

5. A system according to claim 1, the processing unit to execute the processor-executable process steps to cause the system to:
request, from a third application system, third data associated with the data subject;
receive, in response to the request from the third application system, the third data associated with the data subject and third data contexts respectively associated with the third data;
present the third data and the third data contexts to the user;
receive instructions from the user to generate a third configuration including at least one mapping of a third data context to a second descriptive field value;
generate a third report based on the third data, the third data contexts and the third configuration;
present the third report to the user; and
store the third configuration in association with the third application system.

6. A computer-implemented method comprising:
requesting, from a first application system, data associated with a data subject;
receiving, from the first application system and in response to the request, the data associated with the data subject and data contexts respectively associated with the data;
presenting the data and the data contexts to a user;
receiving instructions from the user to generate a first configuration including at least one mapping of a data context to a descriptive field value;
generating a first report based on the data, the data contexts and the first configuration;
presenting the first report to the user;
storing the first configuration in association with the first application system;
requesting, from a second application system, second data associated with the data subject;
receiving, from the second application system, the second data associated with the data subject and second data contexts respectively associated with the second data;
presenting the second data and the second data contexts to the user;
receiving instructions from the user to generate a second configuration including at least one mapping of a second data context to the descriptive field value;
generating a second report based on the second data, the second data contexts and the second configuration;
presenting the second report to the user; and
storing the second configuration in association with the second application system.

7. A method according to claim 6, wherein the user presents the first report and the second report to the data subject.

8. A method according to claim 6, further comprising:
receiving instructions from the user to modify the first configuration to a third configuration;
generating a third report based on the data, the data contexts and the third configuration;
presenting the third report to the user; and
storing the second configuration in association with the first application system.

9. A method according to claim 6, further comprising:
requesting, from a third application system, third data associated with the data subject; and
receiving, in response to the request from the third application system, the third data associated with the data subject and third data contexts respectively associated with the third data, wherein the first report is generated based on the data, the data contexts, the third data, the third data contexts and the first configuration, and wherein the first configuration is stored in association with the first application system and the third application system.

10. A method according to claim 6, further comprising:

requesting, from a third application system, third data associated with the data subject;

receiving, in response to the request from the third application system, the third data associated with the data subject and third data contexts respectively associated with the third data;

presenting the third data and the third data contexts to the user;

receiving instructions from the user to generate a third configuration including at least one mapping of a third data context to a second descriptive field value;

generating a third report based on the third data, the third data contexts and the third configuration;

presenting the third report to the user; and storing the third configuration in association with the third application system.

11. A system comprising:

a first application system to execute first application logic and comprising a first data store;

a second application system to execute second application logic and comprising a data store; and a data component system to:

receive, from a user, a request for data associated with a data subject;

request, from the first application system, data associated with the data subject and stored in the first data store;

receive, from the first application system and in response to the request, the data associated with the data subject and data contexts respectively associated with the data;

present the data and the data contexts to a user;

receive instructions from the user to generate a first configuration including at least one mapping of a data context to a descriptive field value;

generate a first report based on the data, the data contexts and the first configuration;

present the first report to the user;

store the first configuration in association with the first application system;

request, from a second application system, second data associated with the data subject and stored in the second data store;

receive, from the second application system, the second data associated with the data subject and second data contexts respectively associated with the second data;

present the second data and the second data contexts to the user;

receive instructions from the user to generate a second configuration including at least one mapping of a second data context to the descriptive field value;

generate a second report based on the second data, the second data contexts and the second configuration;

present the second report to the user; and store the second configuration in association with the second application system.

12. A system according to claim 11, wherein the user presents the first report and the second report to the data subject.

13. A system according to claim 11, the data component system to:

receive instructions from the user to modify the first configuration to a third configuration;

generate a third report based on the data, the data contexts and the third configuration;

present the third report to the user; and store the third configuration in association with the first application system.

14. A system according to claim 11, further comprising:

a third application system to execute third application logic and comprising a third data store, the data component system to:

request, from the third application system, third data associated with the data subject and stored in the third data store; and receive, in response to the request and from the third application system, the third data associated with the data subject and third data contexts respectively associated with the third data, wherein the first report is generated based on the data, the data contexts, the third data, the third data contexts and the first configuration, and wherein the first configuration is stored in association with the first application system and the third application system.

15. A system according to claim 11, further comprising:

a third application system to execute third application logic and comprising a third data store, the data component system to:

request, from the third application system, third data associated with the data subject and stored in the third data store;

receive, in response to the request from the third application system, the third data associated with the data subject and third data contexts respectively associated with the third data;

present the third data and the third data contexts to the user;

receive instructions from the user to generate a third configuration including at least one mapping of a third data context to a second descriptive field value;

generate a third report based on the third data, the third data contexts and the third configuration;

present the third report to the user; and store the third configuration in association with the third application system.

* * * * *